June 23, 1959  C. A. DITMER ET AL  2,891,627
VARIABLE PITCH PROPELLER AND OIL RESERVOIR THEREFOR
Filed Feb. 3, 1955  8 Sheets-Sheet 1
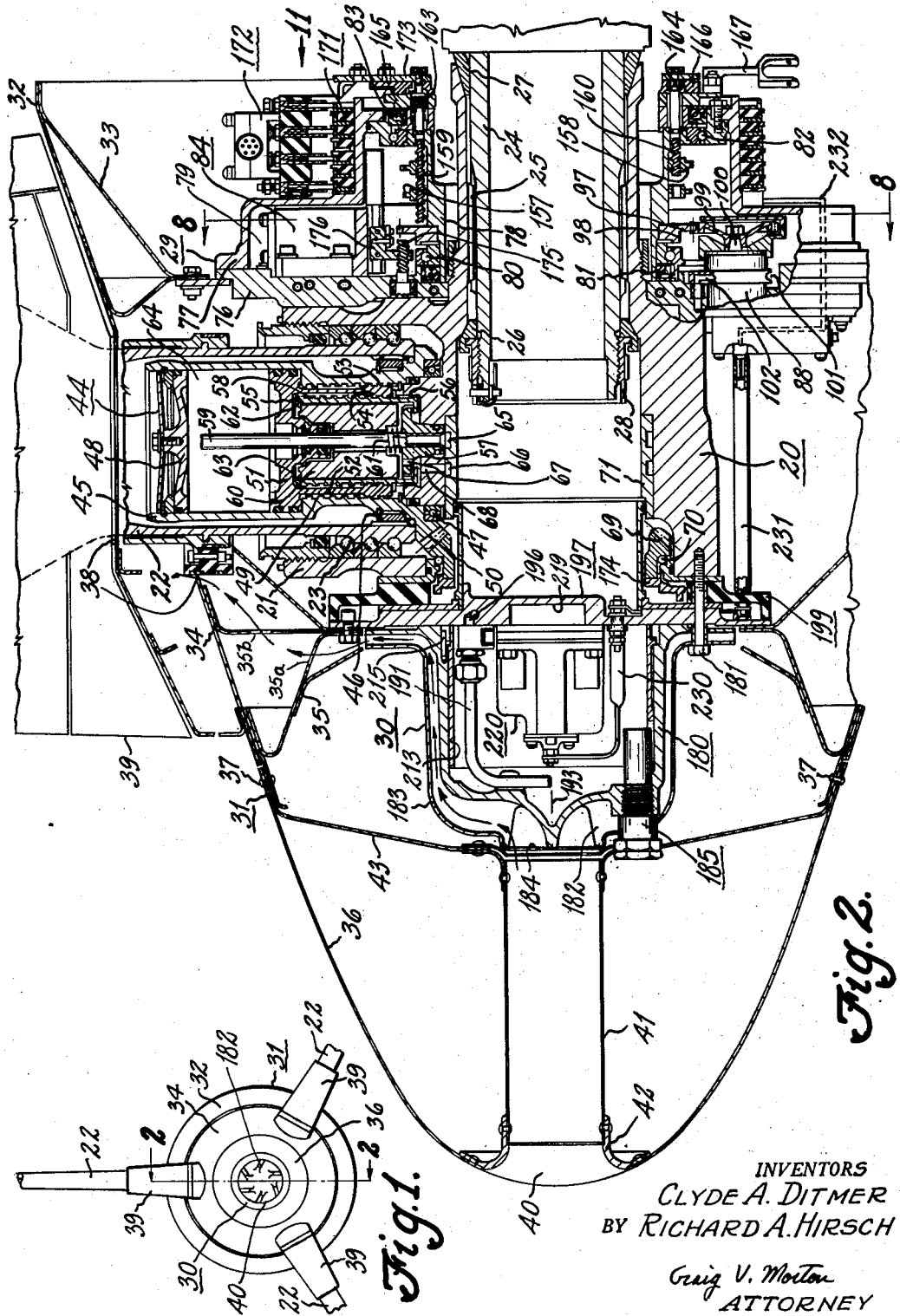
INVENTORS
CLYDE A. DITMER
BY RICHARD A. HIRSCH
Craig V. Morton
ATTORNEY

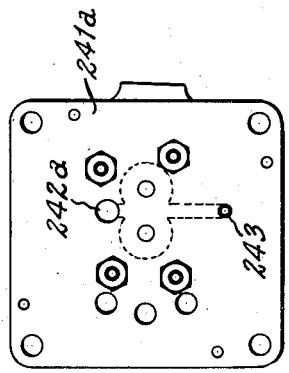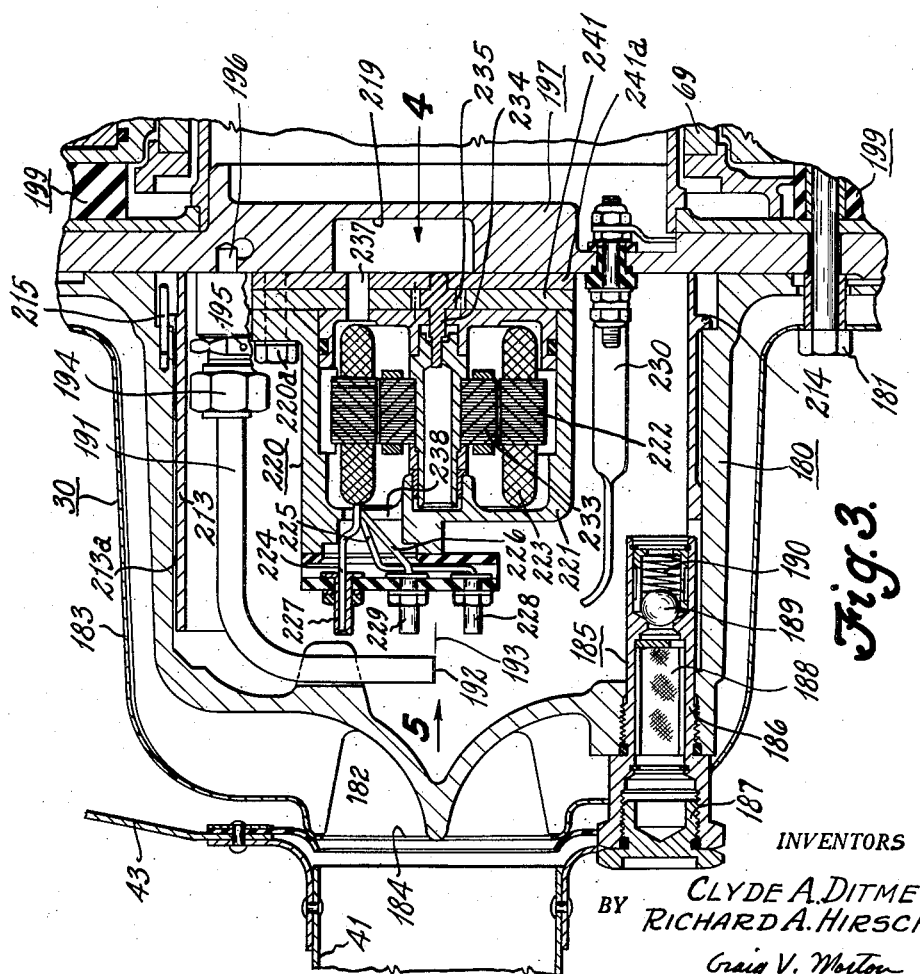

June 23, 1959   C. A. DITMER ET AL   2,891,627
VARIABLE PITCH PROPELLER AND OIL RESERVOIR THEREFOR
Filed Feb. 3, 1955   8 Sheets-Sheet 3

INVENTORS
CLYDE A. DITMER
BY RICHARD A. HIRSCH
Craig V. Morton
ATTORNEY

INVENTORS
CLYDE A. DITMER
BY RICHARD A. HIRSCH

Craig V. Morton
ATTORNEY

INVENTORS
CLYDE A. DITMER
BY RICHARD A. HIRSCH

Craig V. Morton
ATTORNEY

INVENTORS
CLYDE A. DITMER
BY RICHARD A. HIRSCH

Craig V. Morton
ATTORNEY

United States Patent Office 2,891,627
Patented June 23, 1959

2,891,627

VARIABLE PITCH PROPELLER AND OIL RESERVOIR THEREFOR

Clyde A. Ditmer, Piqua, and Richard A. Hirsch, West Milton, Ohio, assignors to General Motors Corporation, Detroit, Mich., a corporation of Delaware Application February 3, 1955, Serial No. 485,921

20 Claims. (Cl. 170—160.23)

This invention pertains to variable pitch propellers, and particularly to variable pitch propellers including hydraulic means for varying propeller pitch.

Hydraulically controlled variable pitch propellers are well known in the art. The propeller of this invention is generally of the type shown in the Blanchard, et al., patents, Nos. 2,307,101 and 2,307,102. In propellers of this type, satisfactory means for cooling the hydraulic fluid employed to actuate the pitch changing means have heretofore never been designed. The present invention relates to a heat exchange oil reservoir assembly through which substantially all of the drain oil from the control valves and the pitch changing means circulates and is cooled during propeller rotation. Accordingly, among our objects are the provision of a variable pitch propeller having hydraulically actuated pitch changing means including a heat exchanger for cooling the hydraulic fluid; the further provision of a heat exchange reservoir assembly for a variable pitch propeller controlled by hydraulically actuated means which is rotatable with the propeller; the further provision of an air cooled reservoir assembly attached to the front of the propeller hub so as to rotate therewith including a finned cover and shroud therefor, which form a pump for effecting air flow across the exterior of the reservoir; and the still further provision of a heat exchange reservoir assembly having disposed therein an electric motor driven feathering pump including means for maintaining the reservoir substantially full of hydraulic fluid at all times so as to maintain the feathering pump in a primed condition.

The aforementioned and other objects are accomplished in the present invention by the provision of passage means for collecting the drain flow from the hydraulic system and directing it to the reservoir where it is cooled, and the further provision of passage means permitting flow of cool oil from the reservoir back to the hydraulic system. Specifically, the propeller includes a hub which is connected to rotate with an engine driven shaft, the hub having a plurality of radially extending sockets. A propeller blade is journaled in each hub socket for rotation about its longitudinal axis to different pitch positions. Each propeller blade is formed with a hollow shank portion within which a torque unit of the type generally shown in the Martin et al. Patent 2,500,692 is disposed. Each torque unit includes portions which are rigidly connected to integral bosses formed on the propeller hub. In addition, each torque unit is operatively connected to its respective blade for imparting rotation thereto about its longitudinal axis so as to vary the pitch position thereof. The pitch adjusting movements of all of the blades in the hub are coordinated through a master gear that meshes with a plurality of blade gears which are connected to rotate with their respective propeller blades.

A regulator is attached to the rear face of the propeller hub so as to rotate therewith. The regulator comprises a front plate, a cover, and a stationary adapter sleeve, which together form a doughnut shaped assembly containing hydraulic fluid. A plurality of gear type pumps are attached to the front plate, the pumps including driving gears which mesh with a stationary gear carried by the adapter sleeve. Accordingly, upon rotation of the front plate and cover relative to the adapter sleeve, the pumps will be actuated and will draw fluid from the doughnut shaped regulator reservoir and discharge fluid under pressure into a tube insert assembly forming an integral part of the front plate. A plurality of control valves are mounted on the front plate, the control valves having connection with the tube insert assembly. The control valves constitute part of the hydraulic system for actuating the pitch changing means, or torque units, of the hub assembly.

The hub is formed with a pair of internal passages which interconnect the torque units with increase and decrease transfer passages in the regulator front plate. A heat exchange reservoir assembly is connected to the front face of the propeller hub, the heat exchange reservoir and the regulator reservoir being interconnected by three internal hub passages. One of these hub passages collects substantially all of the drain flow from the control valves in the regulator and conveys this drain oil to the heat exchange reservoir where it is cooled. A second passage permits the flow of cool oil from the heat exchange reservoir back to the regulator reservoir. The third passage constitutes the discharge conduit for an electric motor driven feathering pump, which is disposed within the heat exchange reservoir.

The heat exchange reservoir comprises a dome-shaped finned cover having a shroud attached thereto so as to form a pump for drawing air across the exterior of the reservoir cover during propeller rotation. In order to facilitate the air flow across the exterior surface of the reservoir cover, the intake of the air pump communicates with a conduit, which is supported by the propeller spinner. The propeller spinner comprises three sections, which generally form a parabolic surface of revolution, the spinner being attached to and rotatable with the propeller hub. The nose portion of the spinner is formed with an opening coaxial with the horizontal axis of propeller rotation, the air intake conduit for the reservoir air pump being disposed within this opening.

The heat exchange reservoir assembly also includes an annular baffle which is spaced inwardly from the internal periphery of the reservoir cover so as to form an annular channel therebetween. The baffle distributes the incoming hot oil over the internal surface of the cool cover so as to facilitate the exchange of heat therebetween.

The heat exchange reservoir is maintained full of oil at all times by reason of the fact that the return flow passage in the hub interconnecting the heat exchange reservoir and the regulator reservoir connects with a conduit disposed in the reservoir and having an inlet opening at the centerline of the reservoir. It will be appreciated that inasmuch as the reservoir rotates with the propeller whereby the centrifugal force to which the oil in the reservoir is subjected tends to throw the oil outwardly, flow from the heat exchange reservoir to the regulator reservoir can only be accomplished when the heat exchange reservoir is full of fluid since only under these conditions will there be any oil at the centerline of the heat exchange reservoir.

During propeller rotation, the gear type pumps in the regulator are driven continuously. The flow produced by these pumps will effect a continuous circulation of oil between the regulator and the heat exchange reservoir irrespective of actuation of the pitch changing torque units. This continuous circulation of fluid from the regulator to the heat exchange reservoir and from the heat exchange reservoir back to the regulator will maintain the oil at a safe operating temperature.

The electric motor driven feathering pump is generally of the type shown in Geyer, et al., Patent 2,695,070, and by reason of the fact that the heat exchange reservoir is maintained full of oil at all times, it will be appreciated that the feathering pump will always be in a primed condition. The electrical connections for the electric motor which drives the feathering pump are constituted by connectors which interconnect the motor with slip rings carried by the regulator cover. The slip rings are engaged by stationary brushes which are carried by a brush block assembly which is attached to the stationary adapter sleeve. The electrical connections and the means for controlling energization of the electric feathering pump motor may be of the type shown in copending application, Serial No. 202,612, filed December 26, 1950, in the name of Treseder, et al., now Patent No. 2,699,304.

Further objects and advantages of the present invention will be apparent from the following description, reference being had to the accompanying drawings wherein a preferred embodiment of the present invention is clearly shown.

In the drawings:

Fig. 1 is a fragmentary view, in elevation, of a variable pitch propeller constructed according to this invention.

Fig. 2 is an enlarged fragmentary view, partly in section and partly in elevation, taken generally along the line 2—2 of Fig. 1.

Fig. 3 is an enlarged fragmentary sectional view of the heat exchange reservoir assembly.

Fig. 4 is a view, in elevation, of the feathering pump back plate, taken in the direction of arrow 4 of Fig. 3.

Figure 5:
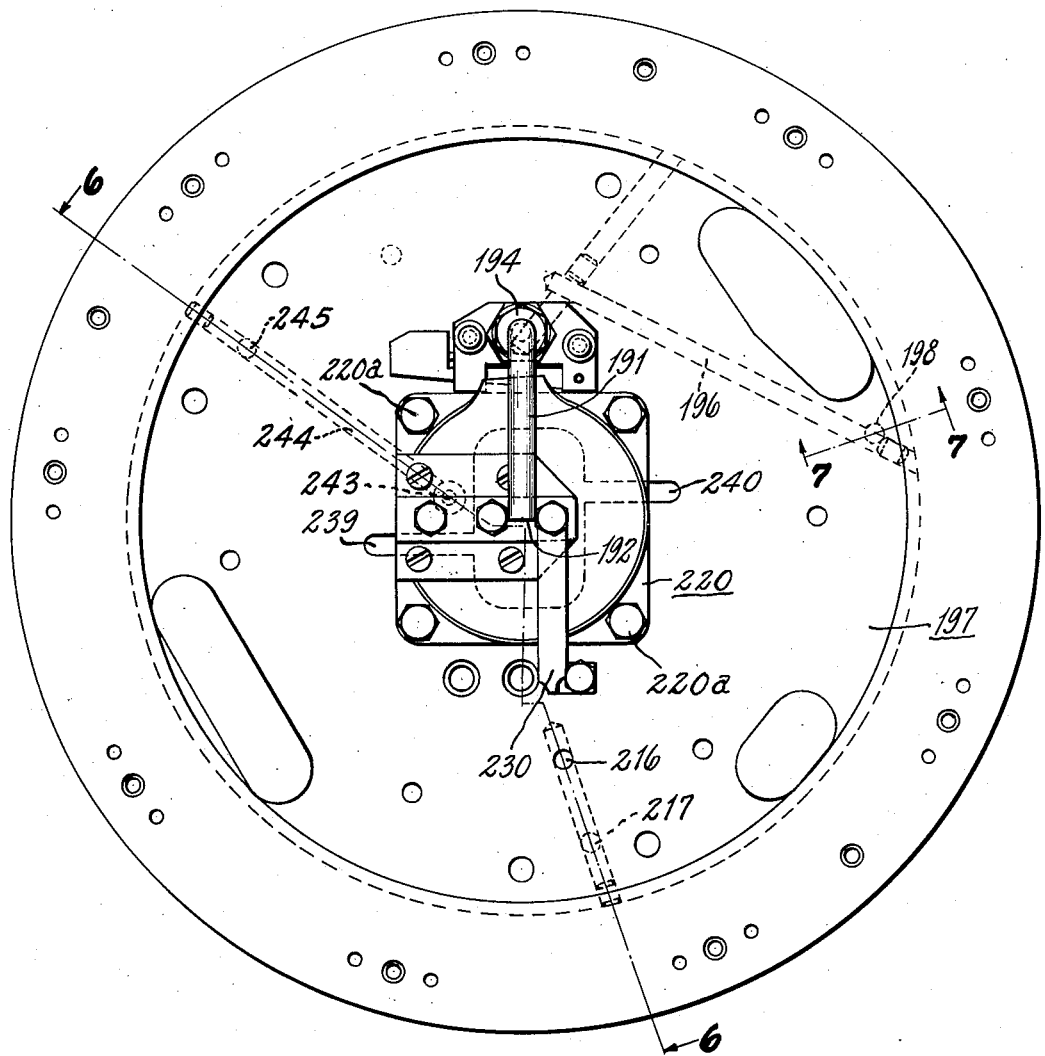
Fig. 5 is an enlarged view, in elevation, of the heat exchange reservoir with the cover removed, taken in the direction of arrow 5 of Fig. 3.

With particular reference to Figs. 1 and 2 of the drawings, the propeller assembly includes a hub 20 having three radially extending blade sockets 21 within which the hollow shank portions of propeller blades 22 are journaled for rotation about their longitudinal axes by a stack bearing assembly 23. The propeller hub 20 is drivingly connected with an engine driven shaft 24 through a straight spline connection 25, axial movement of the hub 20 relative to the shaft 24 being prevented by front and rear cone assemblies 26 and 27, which are drawn into tight engagement with complementary seats on the hub 20 by a shaft nut 28, in a manner well known in the art. A regulator assembly 29 is disposed to the rear of the hub sockets 21 and a heat exchange reservoir assembly 30 is disposed in front of the hub sockets 21.

As shown in Figs. 1 and 2, the hub 20, the regulator 29, and the heat exchange reservoir 30 are enclosed by a spinner of airfoil configuration which is depicted by the numeral 31. The spinner 31 comprises three sections which rotate with the propeller hub 20 and form a parabolic surface of revolution. The three spinner sections include a rear section 32 which is connected by a bulkhead assembly 33 to the regulator 29; an intermediate section 34 which is connected by a bulkhead assembly 35 supported by the propeller hub 20; and a nose or front section 36 which is connected to the intermediate section 34 by any suitable means, such as depicted by numeral 37. The spinner bulkhead 35 is apertured as indicated at 35a and 35b in accordance with conventional practice. Three substantially circular openings 38 are formed between the intermediate and rear spinner sections 34 and 32 through which the shank portions of the propeller blades 22 project. In order to perfect the airfoil contour of the shank portions of the blades 22 which extend outwardly of the spinner profile, each propeller blade has operatively connected thereto and rotatable therewith a cuff element 39 of airfoil shape.

The nose section 36 of the spinner 31 is formed with a centrally disposed opening 40. An air intake conduit 41 is supported within the nose section 36, one end of the conduit 41 being attached to a bracket 42, and the other end of the conduit 41 being attached to a bulkhead 43, the bracket 42 and the bulkhead 43 being suitably connected to the nose section 36. During flight of the aircraft which the propeller assembly of this invention propels, air will flow through the spinner opening 40 and into the conduit 41, the purpose of which will be described hereinafter.

A torque unit 44 is disposed within the hollow shank portion of each propeller blade 22, the torque unit being generally of the type shown in the Martin, et al. Patent 2,500,692. Thus, the torque unit includes a cylinder sleeve 45, which is drivingly connected with the propeller blade 22 through an index ring assembly 46, the cylinder sleeve 45 being supported for rotation relative to the propeller hub 20 by a ball bearing assembly 47. The outer end of the cylinder sleeve 45 is closed by removable cylinder head assembly 48. The cylinder sleeve 45 is formed with a series of internal helical splines 49 and is integral with a bevel type blade gear 50. A reciprocable piston 51 is disposed within the sleeve 45, the piston having an axially extending skirt 52 having a series of external helical splines 53 and a series of internal helical splines 54. The torque unit also includes a member 55, which is rigidly connected to the propeller hub 20 by a helical spline connection 56 and a hollow nut 57. The member 55 is formed with a series of external helical splines 58. The nut 57 has attached thereto a hollow transfer tube 59, which extends through and is slidably engaged by the piston 51. In addition, an aluminum spacer 60 having an enlarged central aperture through which tube 59 extends, is disposed within the member 55, the spacer 60 being urged upwardly, as viewed in Fig. 2, by a spring 61, upward movement of the spacer 60 being limited by a snap ring 62 carried by the member 55. The piston 51 divides the sleeve cylinder 45 into an increase pitch chamber 63 and a decrease pitch chamber 64. The spacer 60 is disposed within the increase pitch chamber 63 to reduce the volume thereof. The piston 51 presents opposed surfaces of equal area to the increase and decrease pitch chambers.

The decrease pitch chamber 64 communicates through the hollow transfer tube 59 with an annular groove 65 in the propeller hub 20. The increase pitch chamber 63 communicates with an annular groove 66 in the hub 20 through an opening 67 in the nut 57 and a radial hub passage 68. During upward movement of the piston 51, as viewed in Fig. 2, rotation will be imparted to the sleeve cylinder 45 and through the index ring assembly 46 to the propeller blade 22, which will increase the pitch position of the propeller blade. Conversely, during downward movement of the piston 51, as viewed in Fig. 2, the sleeve cylinder 45 and the propeller blade 22 will rotate in the opposite direction so as to decrease the pitch position of the propeller blade. The pitch positions of the three propeller blades 22 are coordinated through a master gear 69, which is rotatably journaled in the hub by a ball bearing assembly 70, the master gear 69 meshing with the blade gear 50 of each propeller blade. As more particularly disclosed in copending application, Serial No. 485,922, filed of even date herewith, in the name of Brandes, et al., the propeller blades 22 are subject to aerodynamic and centrifugal twisting moments during propeller rotation, which tend to decrease the blade angle of the propeller blades when the propeller blades are in the governing pitch range. Thus, in order to maintain propeller pitch at a particular angle within the governing range, the increase pitch chambers 63 must be pressurized so that the forces tending to urge the torque unit pistons 51 upwardly are in equilibrium with the twisting moment forces which act through the blade and cylinder to move the piston downwardly. In order to increase propeller pitch, the decrease pitch chambers 64 must be connected to drain while high pressure fluid is supplied to the increase pitch chambers 63. To decrease propeller pitch, the increase pitch chambers are connected to drain, thereby permitting the external twisting moment to reduce propeller pitch, while the decrease pitch chambers 64 are supplied with low pressure fluid to prevent voids therein.

Figure 10:
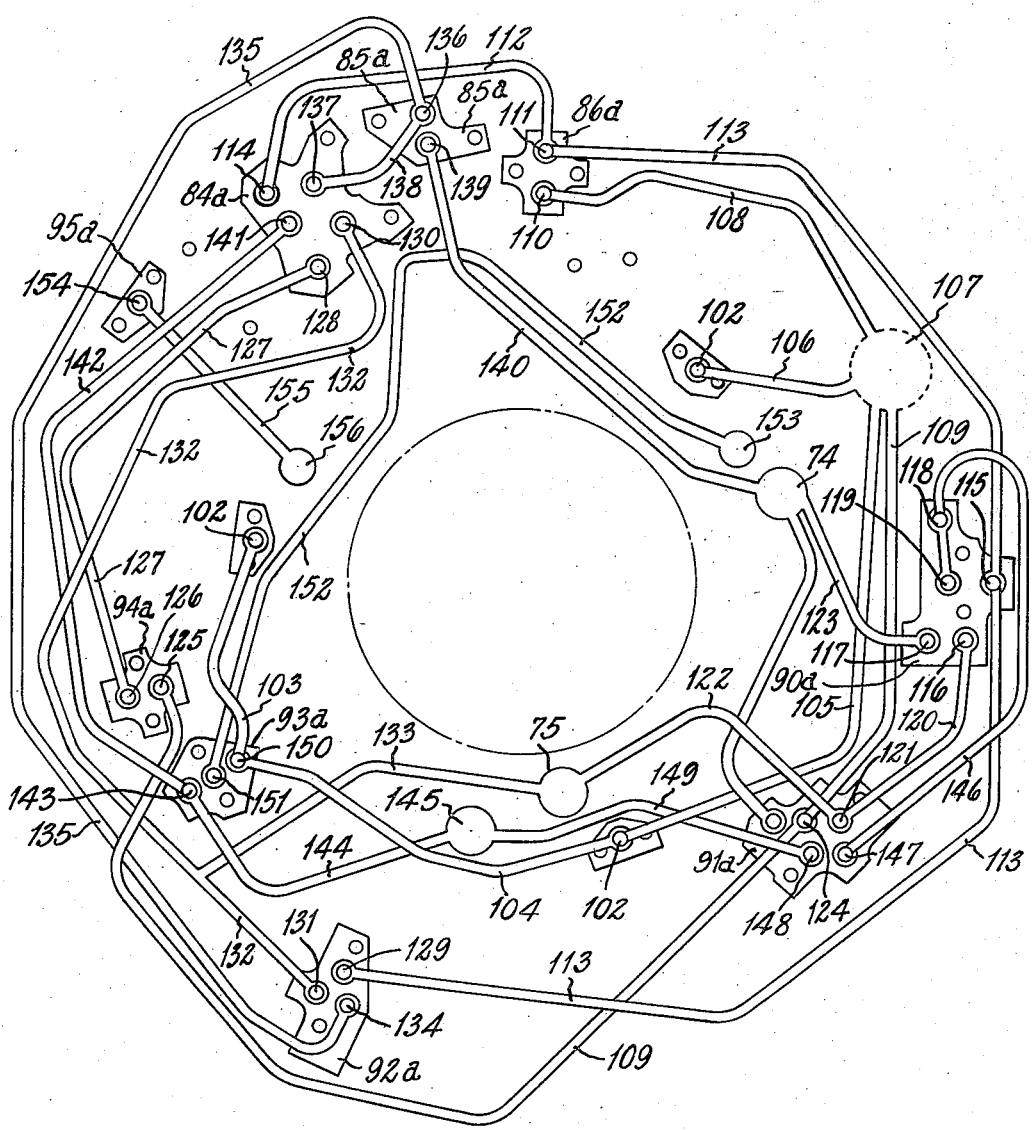
Fig. 10 is a view, in elevation, of the tube insert assembly forming an integral part of the regulator front plate.

With reference to Figs. 2, 6, 8 and 10, the fluid pressure control system for the torque units 44 will be briefly described, this control system being more fully described and claimed in aforementioned copending application Serial No. 485,922. The decrease and increase pitch annular grooves 65 and 66 in the hub 20 are formed in a sleeve 71 which is brazed to the propeller hub 20. The annular groove 65 communicates with a rearwardly extending hub passage 73 and the annular groove 66 communicates with a second rearwardly extending hub passage 72. The sub passages 72 and 73 communicate, respectively, with an increase pitch transfer tube 74 and a decrease pitch transfer tube 75 constituting part of the tube insert assembly depicted in Fig. 10. The tube insert assembly shown in Fig. 10 is cast in the front plate 76 of the regulator assembly 29, the front plate 76 being connected to the propeller hub and rotatable therewith.

As depicted in Fig. 2, the regulator assembly 29 also includes a cover 77, which is attached to the front plate 76 and, thus, rotates with the propeller hub 20. In addition, the regulator assembly 29 includes a stationary adapter sleeve 78, which is attached to the engine supporting structure, not shown, the stationary adapter sleeve 78, the cover 77 and the front plate 76 forming a doughnut-shaped reservoir 79 containing hydraulic fluid. The front plate 76 is journaled for rotation about the adapter sleeve 78 by a ball bearing assembly 80, a suitable fluid seal 81 being interposed between the front plate 76 and the stationary adapter sleeve 78. Similarly, the cover 77 is journaled for rotation about the adapter sleeve 78 by a ball bearing assembly 82, a suitable fluid seal 83, likewise, being interposed between the cover 77 and the adapter sleeve 78. The fluid seals 81 and 83 may be of the type shown in the Martin, et al. Patent 2,352,336.

All of the components of the fluid pressure control system disclosed and claimed in the aforementioned copending application, Serial No. 485,922, are mounted on the inner surface of the front plate 76 and, hence, are rotatable with the propeller. As disclosed in Fig. 8, the components of the fluid pressure control system which are mounted on the front plate 76 include a governor, or control valve assembly 84, a pressure compensating valve assembly 85, a minimum pressure valve 86, gear type pumps 87, 88 and 89, a pressure control valve assembly 90, a pitch lock control valve and decrease pitch supply valve assembly 91, a solenoid valve assembly 92, a feathering pump control valve 93, a pressure reducer valve 94, and a restrictor valve 95. In addition, the regulator front plate 76 supports a centrifugal breather valve 96 of the type shown in Haines Patent 2,357,400.

Figure 8:
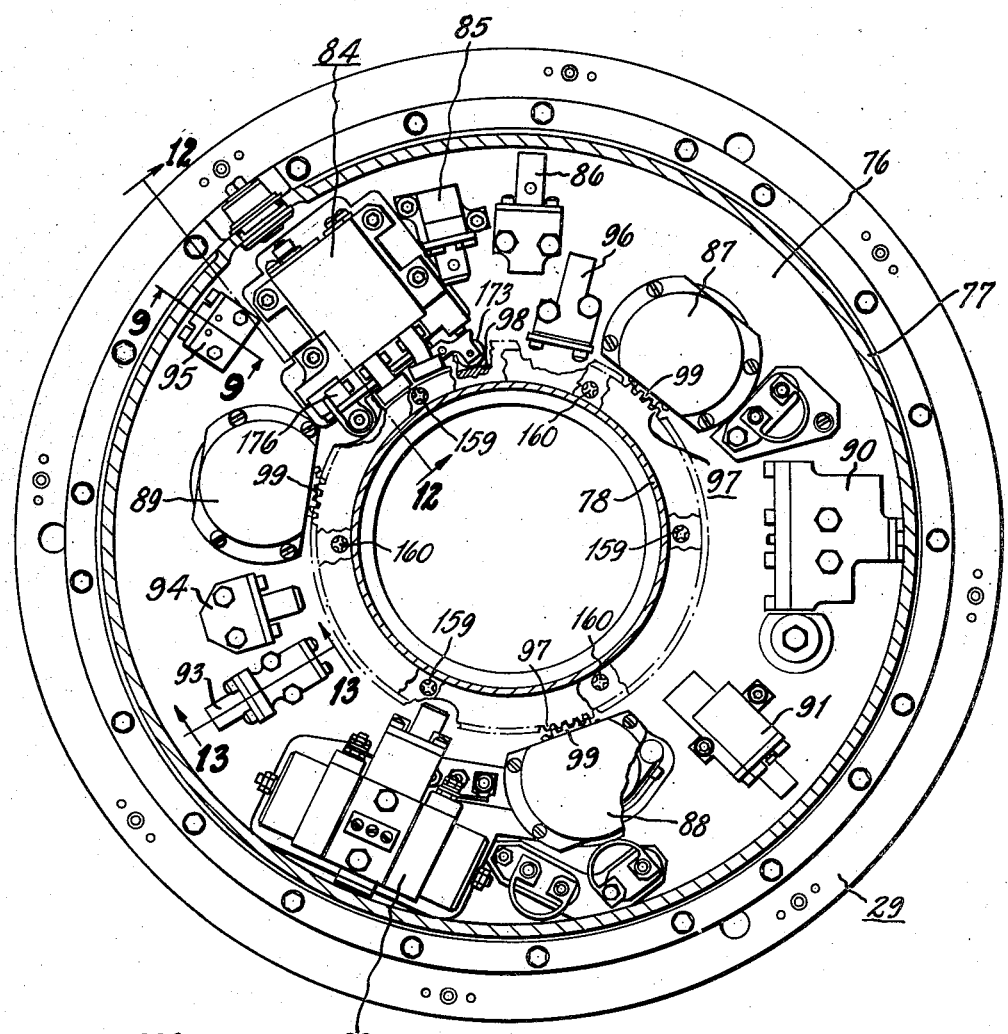
Fig. 8 is an enlarged view, partly in section and partly in elevation, taken along line 8—8 of Fig. 2.

As shown in Figs. 2 and 8, the stationary adapter sleeve 78 has attached thereto a stationary pump power gear 97 having an eccentric shoulder 98 integral therewith. Each pump 87 through 89 includes a driving gear 99 which meshes with the pump power gear 97, the pump driving gear 99 being attached to the pump driving shaft 100, which has attached thereto a gear meshing with a second gear, not shown, to thereby form a gear type pump of the type well known in the art. As shown in Fig. 2, the pump 88 includes an inlet port 101 and an outlet passage 102. The inlet port 101 communicates with the reservoir 79. The outlet passages 102 of the pumps 87 through 89 are interconnected by tubes 103, 104, 105 and 106 with a filter 107. The tubes 103 through 106 and the filter 107 constitute part of the tube insert assembly shown in Fig. 10. Accordingly, upon rotation of the hub 20 and the front plate 76 of the regulator assembly 29 relative to the stationary pump power gear 97, the pumps 87 through 89 will be automatically actuated and will draw fluid from the reservoir 79 and supply it under pressure to the filter 107 from which it flows to tubes 108 and 109. Tube 108 communicates with the inlet port 110 of the minimum pressure valve mounting pad 86a. The outlet port 111 of the mounting pad 86a connects with tubes 112 and 113. Tube 112 connects with high pressure inlet port 114 of the mounting pad 84a of the control valve assembly. Tube 113 communicates with an inlet port 115 of the mounting pad 90a for the pressure control valve assembly. The mounting pad 90a is also formed with a decrease pitch shuttle valve port 116, an increase pitch shuttle valve port 117, and drain ports 118 and 119. The decrease shuttle valve port 116 connects with tube 120, tube 120 connecting with port 121 of the decrease pitch supply valve pad 91a. In addition, the port 121 is connected by a tube 122 to the decrease pitch transfer tube 75. The increase shuttle valve port 117 of the pad 90a is connected to the increase pitch transfer tube 74 by a tube 123.

The tube 109 connects with a port 124 on the pad 91a for the pitch lock control valve, and also connects with an inlet port 125 on pad 94a for the pressure reducer valve. The pad 94a includes an outlet port 126, which connects with tube 127 and supplies constant low pressure fluid to inlet port 128 of the control valve assembly pad 84a. Tube 113 also connects with a supply port 129 of the solenoid valve pad 92a. The decrease pitch ports 130 of the pad 84a and 131 of the pad 92a are connected by a tube 132 which connects with the decrease pitch transfer tube 75 through tube 133. The increase pitch port 134 of the solenoid valve pad 92a is connected by tube 135 to the inlet port 136 of the pressure compensating valve pad 85a. The increase pitch port 137 of the control valve assembly pad 84a is connected with port 136 by a tube 138. The outlet port 139 of the pressure compensating valve pad 85a is connected by tube 140 to the increase pitch transfer tube 74.

Pad 84a includes a drain port 141, which is connected by tube 142 with a drain port 143 on the feathering pump control valve pad 93a. The drain port 143 is, in turn, connected by a tube 144 to a transfer drain tube 145. The drain ports 118 and 119 of the pad 90a are connected by a tube 146 to a port 147 of the pad 91a, the pad 91a also including a drain port 148, which is connected by tube 149 to the transfer drain tube 145. Thus, all drain from the pressure control valve assembly 90, the pitch lock control valve and the decrease pitch supply valve assembly 91 and the control valve assembly 84 flows into transfer tube 145.

The outlet passages 102 of the pumps 87 through 89 are connected by tubes 103 through 106 to an outlet port 150 of the feathering pump control valve pad 93a. The inlet port 151 of the feathering pump control valve pad 93a is connected by tube 152 with a transfer tube 153 which connects with the output of an electric motor driven feathering pump in a manner to be described hereinafter.

The restrictor valve 95 is mounted on a pad 95a having an inlet port 154, which is connected by a tube 155 to a drain transfer tube 156. The drain transfer tube 156 is connected with the drain passage of the heat exchange reservoir 30 in a manner to be described hereinafter.

Figure 11:
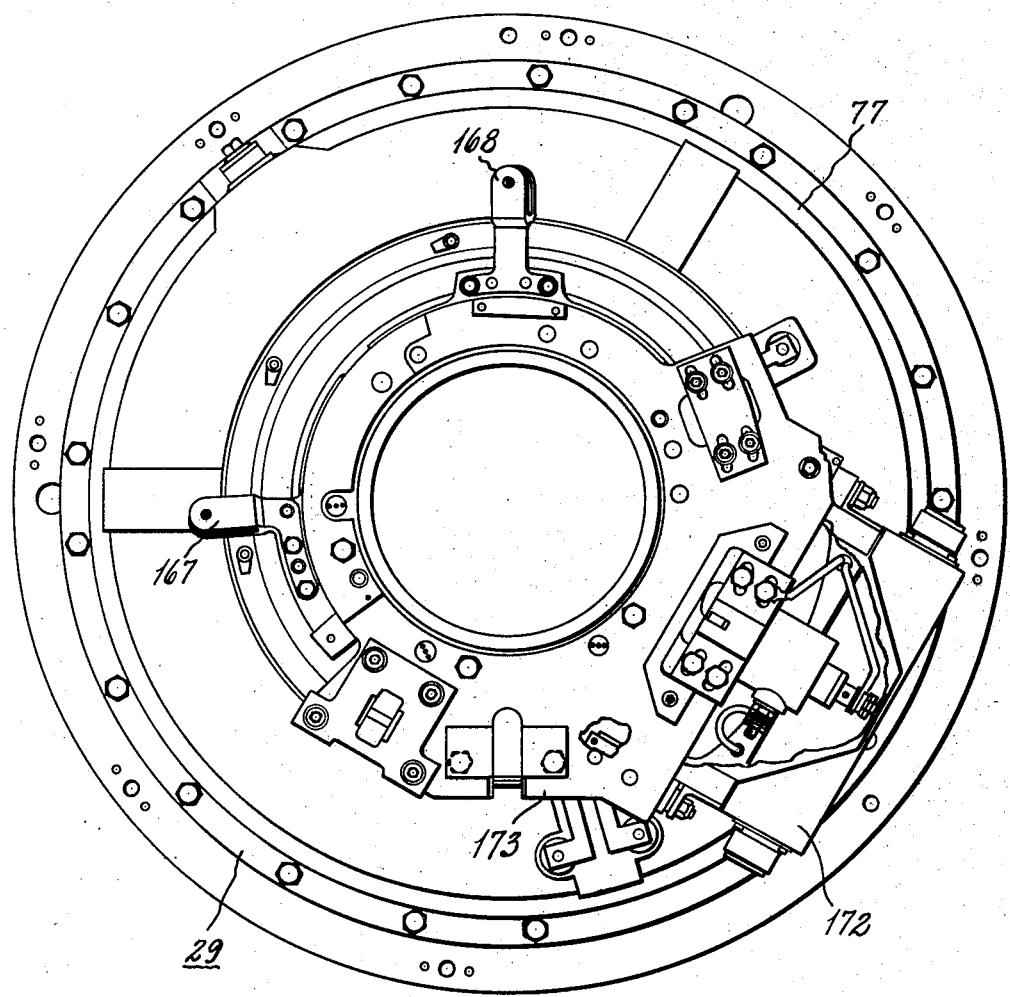
Fig. 11 is an enlarged view, in elevation, taken in the direction of arrow 11 of Fig. 2.
Figure 12:
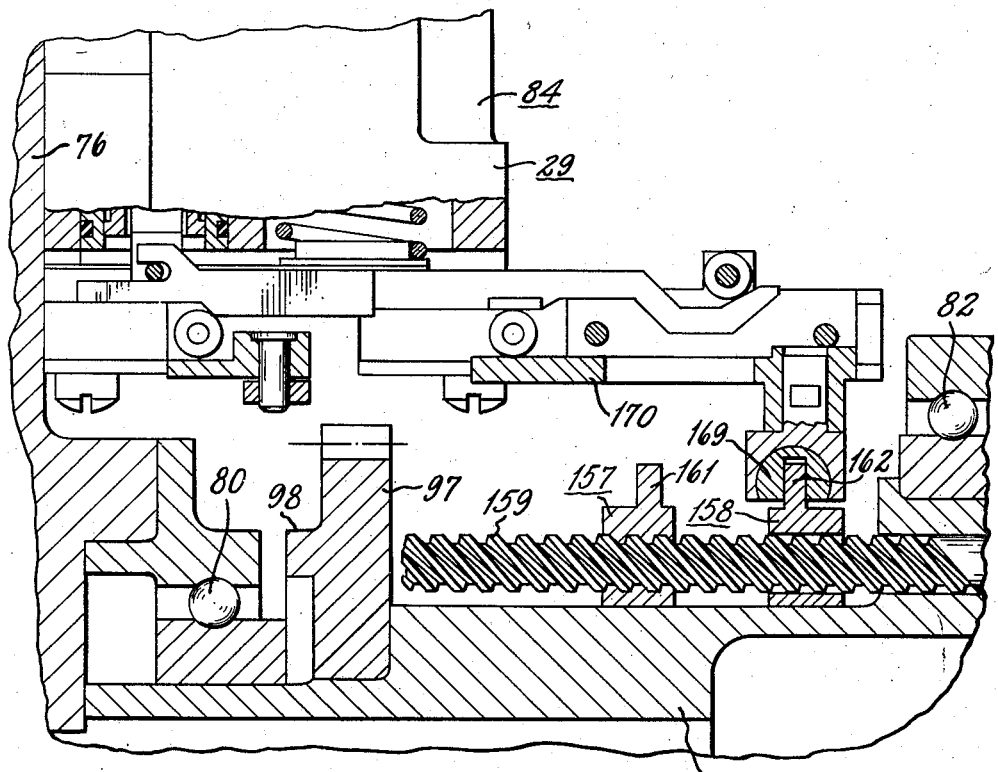
Fig. 12 is a fragmentary view, partly in section and partly in elevation, taken along line 12—12 of Fig. 8.

With particular reference to Figs. 2, 8, 11 and 12, the stationary adapter sleeve 78 has mounted thereon and movable axially relative thereto a condition control ring 157 and an automatic feather control ring 158. The condition control ring 157 is threadedly connected with three circumferentially spaced high lead screws 159, the ring 157 having a tang 161 formed with a slight axial undulation. The high lead screws 159 are connected to pinion gears 163, which mesh with an internal ring gear 165. The internal ring gear 165 is connected with a condition lever 167, as depicted in Figs. 2 and 11, the condition lever 167 constituting part of the adapter assembly. By moving lever 167 relative to the stationary adapter sleeve 78, rotation will be imparted to the pinion gears 163 and the high lead screws 159, thereby effecting axial movement of the condition control ring 157 within the regulator 29. The functions performed by the condition lever 167 are particularly set forth in the aforementioned copending application, Serial No. 485,922.

The control ring 158 threadedly engages three circumferentially spaced high lead screws 160, the control ring 158 also having a tang 162 formed with a slight axial undulation. The high lead screws 160 are connected to pinion gears 164, which mesh with an internal ring gear 166. The internal ring gear 166 is connected to an automatic feathering lever 168, as seen in Fig. 11. Upon movement of the lever 168, rotation will be imparted to the ring gear 166, the pinion gears 164 and the high lead screws 160 so as to effect axial movement of the control ring 158 relative to the stationary adapter sleeve 78. The tank 162 of the control ring 158 receives a self-centering shoe assembly 169 of the type disclosed in the aforementioned copending application, Serial No. 485,922. The control shoe 169 is operatively connected with an automatic feather carriage 170 constituting part of the control valve assembly 84.

As depicted in Fig. 2, the cover 77 of the regulator assembly 29 supports a slip ring assembly 171, which rotates with the propeller. A stationary brush block assembly 172 is carried by a stationary adapter plate 173, the brush block assembly being connected to a source of electric power, not shown. As seen in Fig. 8, the eccentric shoulder 98 formed on the pump power gear 97 is engaged by a roller 173, which constitutes part of the hydraulic jittering mechanism of the control valve assembly 84, as more particularly disclosed in copending application, Serial No. 485,922.

With reference to Figs. 2 and 8, the master gear 69 has attached thereto and rotatable therewith a feedback gear 174, which constitutes a component of the rotary feedback mechanism, which is of the type disclosed in copending application, Serial No. 289,110, filed May 21, 1952, in the name of Richard A. Hirsch, now U.S. Patent No. 2,761,519. This intermittent rotary feedback mechanism is connected with a high lead screw 175 in the regulator 29 by a shaft and gear assembly, not shown, supported for rotation in the hub 20, the high lead screw 175 having threaded connection with a feedback carriage 176 of the control valve assembly 84.

With reference to Figs. 2 through 7, the construction of the heat exchange reservoir 30 will be described. The heat exchange reservoir 30 comprises a dome-shaped cover 180, which is connected by a plurality of bolts, as indicated by numeral 181 to the propeller hub 20. The cover 180 has formed integrally therewith a plurality of circumferentially spaced radially extending fins 182, which are enclosed by a shroud 183 having an inlet opening at 184. The shroud 183 is connected to the finned cover 180 so as to rotate therewith by the bolts 181. The inlet opening 184 of the shroud 183 communicates with the air inlet conduit 41, and the shroud 183 and the fins 182 together from a pump for drawing air through conduit 41 and directing it in heat exchange relationship with the cover 180 so as to effect cooling thereof during propeller rotation. Air discharged by the pump, or fan, can escape to the outside of the spinner through apertures 35a and 35b of the spinner bulkhead 35 and the opening 38 through which the shank portions of the propeller blades 22 project.

As depicted particularly in Fig. 3, the cover 180 carries a filler tube assembly 185 through which hydraulic fluid for initially filling the heat exchange reservoir 30 and the regulator reservoir 79 is supplied. The filler tube assembly 185 includes a tube 186, one end of which is adapted to be closed by a threaded plug 187. A filter 188 is supported within the tube 186. In addition, the tube 186 includes a ball type check valve 189, which is biased by a spring 190. The regulator reservoir and the heat exchange reservoir are initially filled with hydraulic fluid through the filler tube assembly 185 when the propeller is at the angular position depicted in Fig. 2, for a reason which will appear more fully hereinafter.

Figure 7:
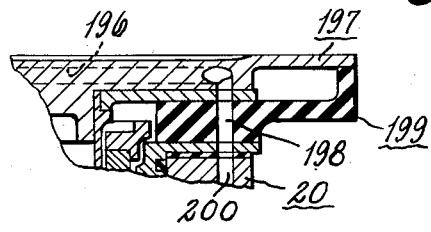
Fig. 7 is a fragmentary sectional view taken along line 7—7 of Fig. 5.

A pick-up tube 191 is disposed in the reservoir 30, the tube having an inlet opening 192 disposed at the centerline 193 of the reservoir 30, the centerline 193 also constituting the axis of propeller rotation. The pick-up tube 191 is carried by a fitting 194 having a bleed orifice 195 therein. The fitting 194 connects with a passage 196 in a back plate 197 of the heat exchange reservoir 30, the back plate 197, likewise, being rigidly connected with the propeller hub 20 by the bolts 181. As seen in Fig. 7, the passage 196 in the back plate 197 connects with a passage 198 in a spacer assembly 199, which is disposed between the back plate 197 and the propeller hub 20. The passage 198 in the spacer assembly 199 connects with a hub passage 200. The hub passage 200 connects with a transfer tube 156 of the tube insert assembly depicted in Fig. 10.

Figure 9:
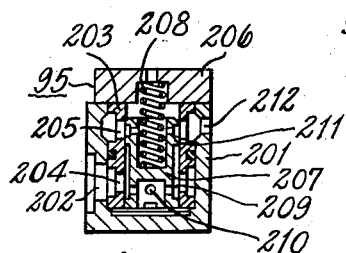
Fig. 9 is an enlarged sectional view taken along line 9—9 of Fig. 8.

With particular reference to Fig. 9, the construction of the restricter valve 95 will be described. The restricter valve 95 includes a valve body 201 having an inlet port 202, which connects with the port 154 on the restricter valve pad 95a. A stationary sleeve 203 having axially spaced sets of ports 204 and 205 is disposed within the recessed valve body 201, the sleeve 203 being retained in position by a plate 206, which is suitably attached to the valve body 201. A check valve plunger 207 is disposed for reciprocable movement within the sleeve 203, the plunger 207 being urged downwardly, as viewed in Fig. 9, by a compression spring 208. The plunger 207 is formed with an annular groove 209, which communicates through openings 210 at all times with the inlet ports 202 and 204. The plunger 207 is also formed with a land 211 for controlling flow through the outlet port 205 of the sleeve 203 and the outlet port 212 of the valve body 201, which connects with the port 204. Actually, the restricter valve 95 comprises a check valve wherein the plunger 207 only opens to interconnect inlet port 202 with outlet port 212 when the pressure acting to urge the plunger 207 upwardly is 20 p.s.i., or more. When the ports 202 and 212 are interconnected, fluid entering port 202 and discharging through port 212 is supplied to the regulator reservoir 79.

When the heat exchange reservoir 30 and the regulator reservoir 79 are initially filled with hydraulic fluid through the filler tube assembly 185 with the propeller in the angular position depicted in Fig. 2, fluid pumped into the interior of the cover 180 through the check valve 189 will begin to fill pick-up tube 191 when the level of hydraulic fluid in the cover 180 rises above the centerline 193 thereof. In order to prevent trapping of air in the heat exchange reservoir, and to assure that the heat exchange reservoir is at all times full of hydraulic fluid, the fitting 194 is formed with the bleed orifice 195. Thus, as the heat exchange reservoir 30 is filled with hydraulic fluid, any air which is trapped therein will be forced through bleed orifice 195 and into passage 196 from whence it will pass through passages 198 and 200 to the restricter valve 95. Any air which is comingled with the hydraulic fluid supplied to the restricter valve 95 will be discharged into the regulator reservoir 79 when the pressure at the inlet port of the restricter valve is 20 p.s.i. or greater. Normally, the regulator reservoir is filled about half full of hydraulic fluid while the heat exchange reservoir is completely filled.

Figure 6:
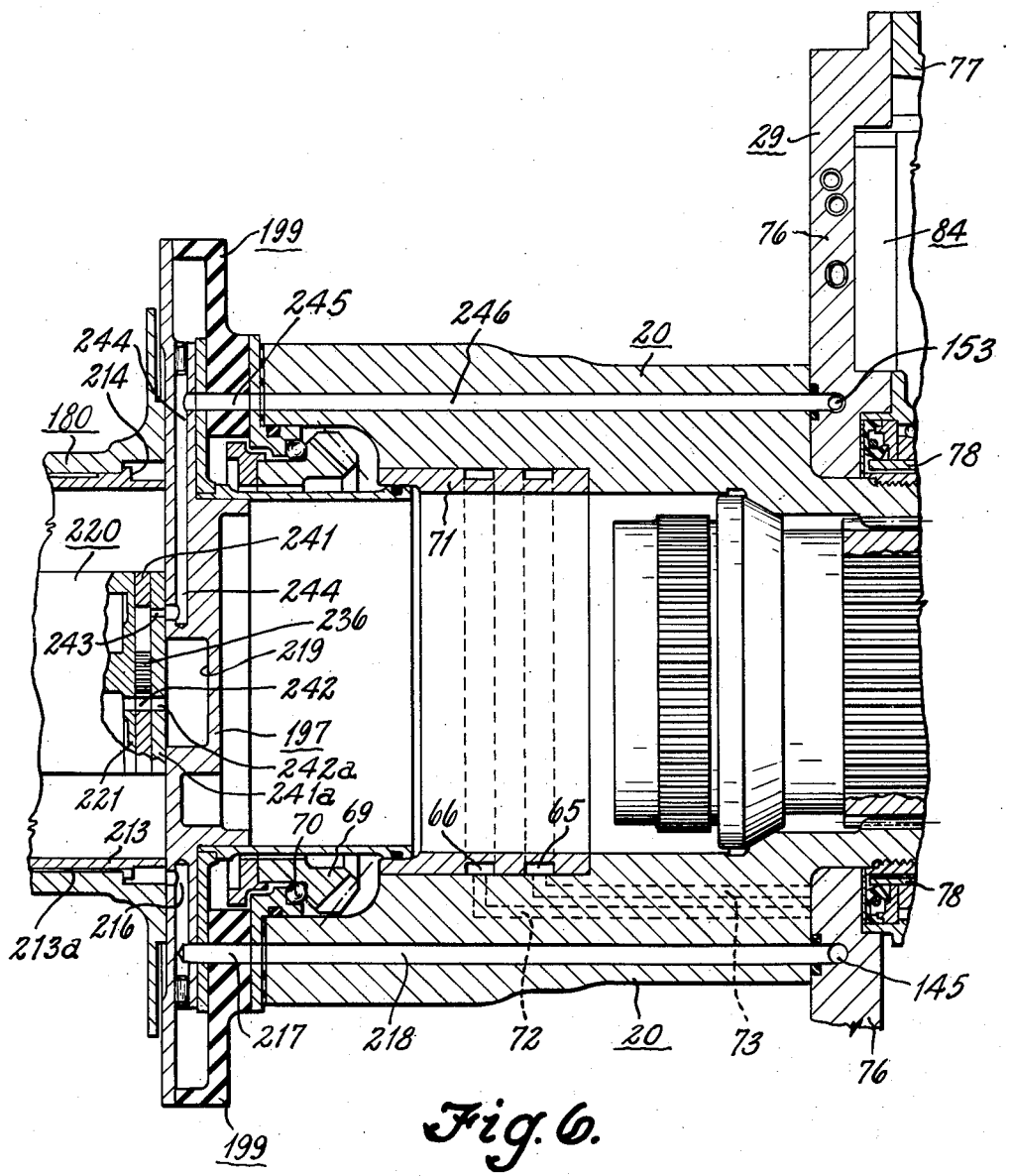
Fig. 6 is an enlarged fragmentary sectional view of the hub depicting the passage means interconnecting the heat exchange reservoir and the regulator, taken along line 6—6 of Fig. 5.

An annular baffle 213 is disposed within the heat exchange reservoir 30, the exterior surface of the baffle 213 being radially spaced from the interior surface of cover 180 so as to form an annular channel 213a therebetween. The baffle 213 is retained in position by the back plate 197 and a shoulder 214, which abuts an internal shoulder of the cover 180. In addition, the baffle 213 is restrained against rotation relative to the cover 180 by a locating pin 215. The annular channel 213a between the baffle 213 and the cover 180 communicates with a passage 216 in the back plate 197, as depicted in Fig. 6. The passage 216 in the plate 197 communicates with a passage 217 in the spacer assembly 199, and passage 217 communicates with hub passage 218. Hub passage 218 communicates with a drain transfer tube 145 of the tube insert assembly, as shown in Figs. 6 and 10. During rotation of the propeller, the excess flow produced by the pumps 87 through 89 is diverted into the tube 146 by the pressure control valve assembly 90, which is connected with tube 147 and the drain transfer tube 145. In addition, all of the drain flow from the torque units which passes through control valve assembly 84, and the bypass drain flow from the feathering pump control valve 93 flows into the drain transfer tube 145 through tubes 142 and 144. This drain fluid has been heated due to fluid friction within the regulator 29 and due to operation of the pumps 87 through 89. Thus, before this drain fluid can be again picked up by the pumps 87 through 89 and supplied to the system, the hot drain fluid flows into transfer tube 145 and, thence, through passages 218, 217 and 216 to the heat exchange reservoir 30 where it is cooled. Since it is well recognized that hot oil is of lesser density than cool oil, and inasmuch as the heat exchange reservoir 30 rotates with the propeller, the denser or cool oil tends to be thrown outwardly by centrifugal force, while the hot oil will collect at the centerline of the reservoir, the incoming hot drain oil from passage 216 is distributed over the cool internal surface of the cover 180 by the baffle 213. This result is achieved since all incoming hot drain oil must flow through the annular channel 213a between the baffle 213 and the cover 180. Thus, the incoming hot drain oil is cooled by coming into contact with the internal surface of cover 180, which is cooled due to operation of air flow across its exterior periphery. After the drain oil has passed through the annular channel 213a, it flows into the heat exchange reservoir 30 proper where it may flow through the open end 192 of pick-up tube 191 and, thence, through the fitting 194, and passages 196, 198 and 200 to the transfer tube 156. From the transfer tube 156, the cooled oil flows through the restricter valve 95 and back to the regulator reservoir 79 through the outlet port 212 of the restricter valve. By reason of the fact that the pressure at the inlet port 202 of the restricter valve 95 must be 20 p.s.i., or greater, to effect movement of the plunger 207 upwardly, as viewed in Fig. 9, so as to interconnect inlet port 202 with outlet port 212, it will be appreciated that the heat exchange reservoir 30 will be maintained full of hydraulic fluid at least 20 p.s.i. pressure at all times since the inlet 192 of the pick-up tube 191 opens at the centerline of the reservoir 30.

Figure 13:
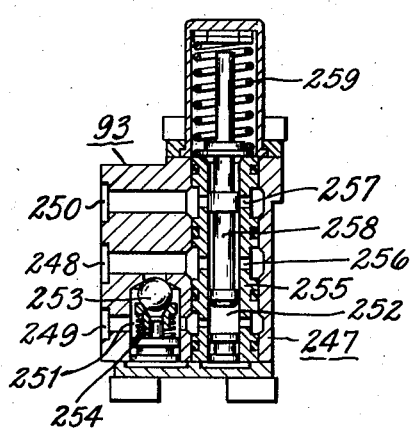
Fig. 13 is an enlarged sectional view taken along line 13—13 of Fig. 8.

The back plate 197 is formed with a sump 219, and an electric motor driven feathering pump, generally designated by the numeral 20, is attached to the back plate 197 by a plurality of bolts 220a, as indicated in Figs. 3 and 5. The electric motor driven feathering pump 220, as depicted in Figs. 2, 3, 5 and 6, and the feathering pump control valve 93, depicted in Fig. 13, are constructed generally in accordance with the aforementioned Geyer et al., Patent 2,695,070. Thus, the assembly 220 includes a three-phase A.C. electric motor having a frame 221, which carries a laminated stator 222 about which field windings 223 are wound. The field windings are connected by wires 224, 225 and 226 to terminals 227, 228 and 229. The terminals 227 through 229 are connected by straps, such as indicated by numeral 230 in Figs. 2 and 3, to connectors, as indicated by numeral 231, which are electrically connected to rings of the slip ring assembly 171 by a conductor, such as indicated by numeral 232. The electrical connections between the slip ring assembly and the windings of the feathering pump motor are of the type disclosed in aforementioned copending application Serial No. 202,612, now Patent No. 2,699,304. Moreover, energization of the feathering pump motor may be controlled by a centrifugal switch of the type shown in application Serial No. 202,612. The feathering pump motor is at all times submerged in the hydraulic fluid contained in the heat exchange reservoir 30. The rotor 233 of the feathering pump motor is connected to a shaft 234, which has affixed thereto a gear 235. The gear 235 meshes with a second gear 236, as shown in Fig. 6, and the gears 235 and 236 constitute a gear type pump, such as is well known in the art. The sump 219 in the back plate 197 is connected with the interior of the heat exchange reservoir 30 through a passage 237, which communicates with the interior of the electric motor, the motor frame 221 having an opening 238 whereby the motor windings are at all times submerged in and cooled by the fluid in the reservoir 30. The sump 219 is also connected by a pair of radially extending passages 239 and 240, which communicate with the interior of the heat exchange reservoir 30.

As seen in Figs. 3, 4 and 6, the gear type pump spacer plate 241a is provided with an inlet opening 242a which communicates with the sump 219 and the interior of the electric motor 220 through opening 242 in the gear type pump bearing plate 241. In addition, the spacer plate 241a is formed with an outlet passage 243, which communicates with passage 244 in the back plate 197. The gear type pump bearing plate 241 is disposed between the motor frame 221 and the spacer plate 241a. The pump gears 235 and 236 are housed in the bearing plate 241.

As depicted in Fig. 6, the passage 244 connects with a passage 245 in the spacer assembly 199, and the passage 245 connects with a passage 246 in the hub 20. The hub passage 246 connects with feathering pump transfer tube 153 of the tube insert assembly, as depicted in Figs. 6 and 10. Accordingly, upon energization of the electric motor driven feathering pump 220, hydraulic fluid will be drawn from the heat exchange reservoir 30, thereby cooling the motor windings, and through the pump inlet passage 242 and discharged under a pressure of 400 p.s.i. This fluid under 400 p.s.i. pressure will flow from the pump outlet passage 243 through passages 244, 245 and 246 to the transfer tube 153. From the transfer tube 153, this 400 p.s.i. pressure fluid will flow through tube 152 to the inlet port 151 of the feathering pump control valve pad 93a, as shown in Fig. 10.

With particular reference to Fig. 13, the construction of the feathering pump control valve 93 will be described. The feathering pump control valve 93 includes a valve body 247 having an inlet port 248, which connects with the inlet port 151 on the pad 93a, an outlet port 249, which connects with pad port 150, and a drain port 250, which connects with pad port 143. The outlet port 249 connects with a check valve chamber 251 and a plunger chamber 252. A spring biased check valve 253 in the chamber 251 blocks communication between the inlet port 248 and the outlet port 249 whenever the pressure at the outlet port plus the force of spring 254 is greater than the pressure at the inlet port. A stationary porting sleeve 255 having spaced sets of ports 256 and 257 is disposed within the chamber 252, ports 256 connecting with the inlet ports 248 and ports 257 connecting with the drain port 250. A two-land reciprocable plunger 258 is disposed within the sleeve 255, the plunger 258 being urged to the position depicted in Fig. 13 by a compression spring 259. When the system pressure existent at the outlet port 249 and communicated to chamber 252 is greater than the force of spring 259, namely 400 p.s.i., the plunger 258 will be urged upwardly so as to interconnect ports 256 and 257 whereupon the flow developed by the electric motor driven feathering pump 220 will be bypassed from the inlet port 248 to the drain port 250 and, thence, to drain port 143 on the pad 93a through tube 144 to the transfer drain tube 145. From the transfer drain tube 145, the flow produced by the electric motor driven feathering pump 220 will flow through passages 218, 217 and 216 back to the heat exchange reservoir 30, as depicted in Fig. 6.

However, during energization of the electric motor driven feathering pump when the propeller is stationary, or rotating so slowly that the system pumps 87 through 89 develop an output pressure of less than 400 p.s.i., the spring 259 will move the plunger 258 to the position depicted in Fig. 13. At this time, flow produced by the feathering pump and supplied to inlet port 248 cannot flow to the drain port 250 and, hence, will open check valve 253 and flow through outlet port 249 to pad port 150, as viewed in Fig. 10, and, thence, to the system tube 104. Thus, when the propeller is stationary, or rotating at a very slow speed, fluid under pressure for actuating the pitch changing torque units is supplied to the system by the electric motor driven feathering pump.

From the foregoing, it is apparent that the present invention provides continuous cooling for the hydraulic fluid employed to actuate the pitch changing motors. Moreover, during propeller rotation, the propeller driven pumps will effect a continuous flow of oil between the regulator reservoir and the heat exchange reservoir, which will cool the oil so as to maintain the oil at a safe operating temperature under all conditions. Furthermore, by mounting the electric motor driven feathering pump within the heat exchange reservoir, which is maintained full of hydraulic fluid at all times, the electric motor driven feathering pump will always be in a primed condition.

While the embodiment of the present invention as herein disclosed, constitutes a preferred form, it is to be understood that other forms might be adopted.

What is claimed is as follows:

1. In a variable pitch propeller having a plurality of propeller blades supported for rotation about their longitudinal axes, a regulator connected to rotate with said propeller, fluid pressure operated motor means operatively connected to said blades for effecting rotation of said blades about their longitudinal axes and a fluid pressure system contained in said regulator for controlling the actuation of said motor means, pressure developing means energized incident to rotation of the propeller and disposed within said regulator for drawing fluid from said regulator and supplying said fluid under pressure to said system, heat exchange means for continuously cooling the fluid of said fluid pressure system during propeller rotation, including a heat exchange reservoir attached to said propeller and rotatable therewith, and pressure developing means disposed within said reservoir and operable independently of rotation of said propeller for drawing fluid from said reservoir and supplying said fluid under pressure to said system, means rotatable with said propeller for effecting a flow of air across the exterior periphery of said reservoir during propeller rotation, means for conducting drain fluid from said system contained in said regulator to said reservoir so as to be cooled therein, and means for conducting cool fluid from said reservoir back to said regulator.

2. In a variable pitch propeller having a hub, a plurality of blades journaled in said hub for rotation about their longitudinal axes to different pitch positions, fluid pressure operated motor means operatively connected to said blades for adjusting the pitch position thereof, a regulator having a fluid reservoir attached to and rotatable with said propeller and a fluid pressure control system disposed within said regulator for actuating said motor means, pressure developing means disposed within said regulator and energized incident to rotation of said propeller for drawing fluid from said regulator reservoir and supplying the fluid under pressure to said system, heat exchange means for cooling the fluid in said fluid pressure system including a heat exchange reservoir attached to and rotatable with said hub and pressure developing means disposed within said heat exchange reservoir and operable independently of rotation of said propeller for drawing fluid from said heat exchange reservoir and supplying the fluid under pressure to said system, said reservoir having a plurality of external fins, a shroud enclosing said fins so as to form a pump for effecting air flow across the exterior of said reservoir during propeller rotation, passage means in said hub interconnecting said fluid pressure system and said heat exchange reservoir for collecting drain fluid from said system and conducting said drain fluid to said heat exchange reservoir, a pick-up tube in said heat exchange reservoir, and passage means in said hub interconnecting said pick-up tube and said regulator reservoir for conducting fluid which has been cooled in said heat exchange reservoir back to said regulator reservoir.

3. In a variable pitch propeller having a plurality of adjustable pitch blades and fluid pressure operated motor means operatively connected with said blades for adjusting the pitch position thereof, a reservoir rotatable with said propeller and containing a quantity of fluid medium, a fluid pressure system for actuating said motor means, pressure developing means carried by said propeller for drawing fluid medium from said reservoir and supplying said fluid medium under pressure to said system, means connected to said system for receiving at least a portion of the drain fluid medium therefrom, heat exchange means rotatable with said propeller, pressure developing means disposed within said heat exchange means for drawing fluid therefrom and supplying said fluid under pressure to said system, first passage means interconnecting said drain fluid medium receiving means and said heat exchange means whereby said drain fluid medium will flow to said heat exchange means, and second passage means interconnecting said heat exchange means and said reservoir whereby fluid medium from said heat exchange means can return to said reservoir.

4. In a variable pitch propeller having a plurality of adjustable pitch blades and fluid pressure operated motor means operatively connected with said blades for adjusting the pitch position thereof, a regulator rotatable with said propeller and containing a quantity of fluid medium, a fluid pressure system for actuating said motor means, pressure developing means disposed in said regulator for drawing fluid medium from said regulator and supplying said fluid medium under pressure to said fluid system, said pressure developing means being automatically operable during propeller rotation, means connected to said system for receiving at least a portion of the drain fluid medium therefrom, heat exchange means rotatable with said propeller, pressure developing means disposed within said heat exchange means for drawing fluid therefrom and supplying said fluid under pressure to said system, first passage means interconnecting said drain fluid medium receiving means and said heat exchange means whereby said drain fluid medium will flow to said heat exchange means, and second passage means interconnecting said heat exchange means and said regulator whereby fluid medium from said heat exchange means can return to said regulator.

5. In a variable pitch propeller having a plurality of adjustable pitch blades and fluid pressure operated motor means operatively connected with said blades for adjusting the pitch position thereof, a regulator rotatable with said propeller and containing a quantity of fluid medium, a fluid pressure system for actuating said motor means, pressure developing means disposed in said regulator for drawing fluid medium from said regulator and supplying said fluid medium under pressure to said fluid system, said pressure developing means being automatically operable during propeller rotation, means connected to said system for receiving at least a portion of the drain fluid medium therefrom, an air cooled heat exchange reservoir carried by said propeller, pressure developing means disposed within said heat exchange reservoir for drawing fluid therefrom and supplying said fluid under pressure to said system, first passage means interconnecting said drain fluid medium receiving means and said heat exchange reservoir whereby said drain fluid medium will flow to said heat exchange reservoir, and second passage means interconnecting said heat exchange reservoir and said regulator whereby fluid medium from said heat exchange reservoir can return to said regulator.

6. In a variable pitch propeller having a plurality of adjustable pitch blades and fluid pressure operated motor means operatively connected with said blades for adjusting the pitch position thereof, a regulator rotatable with said propeller and containing a quantity of fluid medium, a fluid pressure system for actuating said motor means, pressure developing means disposed in said regulator for drawing fluid medium from said regulator and supplying said fluid medium under pressure to said fluid system, said pressure developing means being automatically operable during propeller rotation, means connected to said system for receiving at least a portion of the drain fluid medium therefrom, an air cooled heat exchange reservoir carried by said propeller, an electric motor driven pump submerged in said heat exchange reservoir and connectable with said system for supplying fluid medium under pressure to said system, first passage means interconnecting said drain fluid medium receiving means and said heat exchange reservoir whereby said drain fluid medium will flow to said heat exchange reservoir, and second passage means interconnecting said heat exchange reservoir and said regulator whereby fluid medium from said heat exchange reservoir can return to said regulator.

7. The invention set forth in claim 6 wherein said pump has an inlet connected with said heat exchange reservoir and an outlet, and wherein said propeller includes third passage means interconnecting said pump outlet and said system.

8. In a variable pitch propeller having a plurality of adjustable pitch blades and fluid pressure operated motor means operatively connected with said blades for adjusting the pitch position thereof, a regulator rotatable with said propeller and containing a quantity of fluid medium, a fluid pressure system for actuating said motor means, pressure developing means disposed in said regulator for drawing fluid medium from said regulator and supplying said fluid medium under pressure to said fluid system, said pressure developing means being automatically operable during propeller rotation, means connected to said system for receiving at least a portion of the drain fluid medium therefrom, an air cooled heat exchange reservoir carried by said propeller, first passage means interconnecting said drain fluid medium receiving means and said heat exchange reservoir whereby said drain fluid medium will flow to said heat exchange reservoir, second passage means interconnecting said heat exchange reservoir and said regulator whereby fluid medium from said heat exchange reservoir can return to said regulator, and valve means responsive to pressure in said heat exchange reservoir disposed in said regulator and connected with said second passage means for controlling the flow of fluid medium from said heat exchange reservoir to said regulator.

9. In a variable pitch propeller, a propeller hub, a plurality of adjustable pitch blades journaled for rotation about their longitudinal axes in said hub, fluid pressure operated motor means carried by said hub and operatively connected to said blades for adjusting the pitch position thereof, a regulator rotatable with said propeller and containing a quantity of fluid medium, a fluid pressure system for actuating said motor means, pressure developing means disposed within said regulator for drawing fluid medium therefrom and delivering said fluid medium under pressure to said system, means connected to said system for receiving at least a portion of the drain fluid medium therefrom, heat exchange means rotatable with the propeller, pressure developing means disposed within said heat exchange means for drawing fluid therefrom and supplying said fluid under pressure to said system, a first passage in said hub interconnecting said drain receiving means and said heat exchange means whereby said drain fluid medium will flow to said heat exchange means, and a second passage in said hub and interconnecting said heat exchange means and said regulator whereby fluid medium from said heat exchange means can return to said regulator.

10. The invention set forth in claim 9 wherein said regulator is attached to the rear of said propeller hub, and wherein said heat exchange means includes an air cooled heat exchange reservoir attached to the front of said propeller hub.

11. The invention set forth in claim 10 wherein said propeller includes a spinner attached to said propeller hub and rotatable therewith, said spinner enclosing said hub, said regulator and said air cooled heat exchange reservoir.

12. The invention set forth in claim 9 wherein said heat exchange means includes a heat exchange reservoir attached to the front of said propeller hub and rotatable therewith, and wherein said propeller hub and heat exchange reservoir are enclosed by a spinner attached to and rotatable with said propeller hub, said spinner having an air inlet opening therein through which air is admitted for cooling said heat exchange reservoir.

13. The invention set forth in claim 9 wherein said heat exchange means includes an air cooled heat exchange reservoir attached to and rotatable with said propeller hub, wherein said propeller includes a spinner attached to and rotatable with said propeller hub, said spinner having an air inlet opening therein, and wherein said propeller includes pump means for drawing air through said spinner inlet opening and directing said air across the external periphery of said heat exchange reservoir.

14. The invention set forth in claim 13 wherein said heat exchange reservoir comprises a cover attached to said propeller hub, said cover having a plurality of external fins, and a shroud attached to said cover and enclosing said fins, said pump means being constituted by said fins and said shroud.

15. The invention set forth in claim 13 wherein said spinner includes an air inlet conduit, one end of said air inlet conduit communicating with said spinner inlet opening and the other end of said conduit communicating with said pump means.

16. The invention set forth in claim 9 wherein said heat exchange means comprises a heat exchange reservoir attached to and rotatable with said propeller hub, said reservoir including a cover, an annular baffle carried by and disposed within said cover in spaced relation thereto to form an annular channel therebetween, said first hub passage connecting with the annular channel whereby said drain fluid medium is distributed over the inner surface of said cover by said baffle.

17. In a variable pitch propeller controlled by a fluid pressure system, an air cooled heat exchange reservoir for fluid medium in said system including in combination, a cover rotatable with said propeller, an annular baffle disposed in and carried by said cover in spaced relation thereto so as to form an annular channel therebetween adapted to receive heated fluid medium from said system and distribute said heated fluid medium over the inner surface of said cover, and a pick-up tube disposed within and carried by said cover, said pick-up tube having an inlet at substantially the center of said reservoir for returning fluid medium cooled in said heat exchange reservoir to said system.

18. In a variable pitch propeller having a plurality of adjustable pitch blades and fluid pressure operated motor means operatively connected with said blades for adjusting the pitch position thereof, a regulator rotatable with said propeller and containing a quantity of fluid medium, a fluid pressure system for actuating said motor means, pressure developing means disposed in said regulator and operated during propeller rotation for drawing fluid medium from the regulator and supplying said fluid medium under pressure to said system, means connected to said system for receiving at least a portion of the drain fluid medium therefrom, an air-cooled heat exchange reservoir carried by said propeller, first passage means interconnecting said drain fluid medium receiving means and said heat exchange reservoir whereby said drain fluid medium will flow to said heat exchange reservoir, second passage means interconnecting said heat exchange reservoir and said regulator whereby cool fluid medium from said heat exchange reservoir can return to said regulator, and a restrictor valve operatively connected with said second passage means comprising a valve body having an inlet port connected to said second passage means, an outlet port connected to said regulator, and a spring-biased servo actuated plunger therein, said plunger having a surface exposed to the fluid medium at the inlet port and responsive to a predetermined pressure of the fluid medium at the inlet port for interconnecting said inlet and outlet ports to permit flow of cool fluid medium from said heat exchange reservoir through said second passage means to said regulator.

19. In a variable pitch propeller, a propeller hub, a plurality of adjustable pitch blades journalled for rotation about their longitudinal axes in said hub, fluid pressure operated motor means carried by said hub and operatively connected to said blades for adjusting the pitch position thereof, a regulator rotatable with said propeller and containing a quantity of fluid medium, a fluid pressure system for actuating said motor means, pressure developing means disposed within said regulator for drawing fluid medium therefrom and delivering said fluid medium under pressure to said system, means connected to said system for receiving at least a portion of the drain fluid medium therefrom, heat exchange means rotatable with the propeller comprising heat exchange reservoir attached to and rotatable with said propeller having a pick-up tube with an inlet disposed at substantially the center of said reservoir, a first passage in said hub interconnecting said drain receiving means and said heat exchange reservoir whereby said drain fluid medium will flow to said heat exchange reservoir, and a second passage in said hub interconnecting said pick-up tube and said reservoir whereby fluid medium from said heat exchange reservoir can return to said regulator.

20. In a variable pitch propeller, a propeller hub, a plurality of adjustable pitch blades journalled for rotation about their longitudinal axes in said hub, fluid pressure operated motor means carried by said hub and operatively connected to said blades for adjusting the pitch position thereof, a regulator rotatable with said propeller and containing a quantity of fluid medium, a fluid pressure system for actuating said motor means, a pressure developing means disposed within said regulator for drawing fluid medium therefrom and delivering said fluid medium under pressure to said system, means connected to said system for receiving at least a portion of the drain fluid medium therefrom, heat exchange means rotatable with the propeller, a first passage in said hub interconnecting said drain receiving means and said heat exchange means whereby said drain fluid medium will flow to said heat exchange means, a second passage in said hub and interconnecting said heat exchange means and said regulator whereby fluid medium from said heat exchange means can return to said regulator, and valve means in said regulator responsive to pressure in said heat exchange means and connected with said second hub passage for controlling the flow of fluid medium between said heat exchange means and said regulator.

References Cited in the file of this patent

UNITED STATES PATENTS

| | | |
|---|---|---|
| 2,695,070 | Geyer et al. | Nov. 23, 1954 |
| 2,719,592 | Blanchard | Oct. 4, 1955 |
| 2,779,423 | Cushman | Jan. 29, 1957 |